(12) United States Patent
Song

(10) Patent No.: US 10,647,237 B2
(45) Date of Patent: May 12, 2020

(54) SYSTEMS AND METHODS FOR PROVIDING CUSTOMIZED AND ADAPTIVE MASSAGING IN VEHICLE SEATS

(71) Applicant: Faraday & Future Inc., Gardena, CA (US)

(72) Inventor: Xiufeng Song, San Jose, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days.

(21) Appl. No.: 15/639,297

(22) Filed: Jun. 30, 2017

(65) Prior Publication Data

US 2018/0170231 A1 Jun. 21, 2018

Related U.S. Application Data

(60) Provisional application No. 62/357,154, filed on Jun. 30, 2016.

(51) Int. Cl.
| | |
|---|---|
| *G01S 19/05* | (2010.01) |
| *B60N 2/90* | (2018.01) |
| *B60W 30/182* | (2020.01) |
| *B60W 10/04* | (2006.01) |
| *B60W 10/30* | (2006.01) |

(52) U.S. Cl.
CPC ............ *B60N 2/976* (2018.02); *B60W 10/04* (2013.01); *B60W 10/30* (2013.01); *B60W 30/182* (2013.01); *B60W 2600/00* (2013.01)

(58) Field of Classification Search
CPC .. B60K 35/00; B60G 17/016; B60G 17/0152; B60G 17/0716; G01S 19/05; G16H 70/00; B60W 10/04; B60W 10/30; B60W 30/182; B60W 2600/00; B60N 2/976
See application file for complete search history.

(56) References Cited

U.S. PATENT DOCUMENTS

| | | | |
|---|---|---|---|
| 9,379,805 B2* | 6/2016 | Hannon | B60K 35/00 |
| 2011/0183601 A1* | 7/2011 | Hannon | B60K 35/00 |
| | | | 455/1 |
| 2014/0207333 A1* | 7/2014 | Vandivier | B60N 2/976 |
| | | | 701/36 |
| 2014/0309870 A1* | 10/2014 | Ricci | H04W 4/21 |
| | | | 701/36 |
| 2016/0354027 A1* | 12/2016 | Benson | A61M 21/02 |
| 2017/0129335 A1* | 5/2017 | Lu | G16H 70/00 |

(Continued)

OTHER PUBLICATIONS

Dong et al., H∞robust control of a seat belt load-limiting device, 2011, IEEE, p. 6840-6845.*

(Continued)

*Primary Examiner* — McDieunel Marc
(74) *Attorney, Agent, or Firm* — Veros Legal Solutions, LLP

(57) ABSTRACT

Various embodiments are presented for providing customized and adaptive massaging in vehicle seats. A method for providing customized and adaptive massaging in vehicle seats is disclosed. The method includes the steps of receiving profile information associated with an occupant of a seat of a vehicle; receiving a current driving mode of the vehicle, selecting a massage setting for the seat based on the profile information and the current driving mode, and massaging the occupant of the seat based on the massage setting.

20 Claims, 6 Drawing Sheets

(56) References Cited

U.S. PATENT DOCUMENTS

2017/0136842 A1* 5/2017 Anderson ............ B60G 17/016
2017/0265044 A1* 9/2017 Lundsgaard ............ G01S 19/05
2017/0282822 A1* 10/2017 Hunter, Jr. ............. B60K 35/00
2018/0345748 A1* 12/2018 Vogt .................. B60G 17/0152

OTHER PUBLICATIONS

Bertolotti et al., Self-Adaptive Prototype for Seat Adaption, 2010, IEEE, p. 136-141 (Year: 2010).*
Bo et al., Detecting Driver's Smartphone Usage via Nonintrusively Sensing Driving Dynamics, 2016, IEEE, p. 340-350 (Year: 2016).*
Paruchuri et al., Detecting Driver Distraction Using Smartphones, 2015, IEEE, p. 468-475 (Year: 2015).*

* cited by examiner

| Actuator | Sequence | Output | Duration |
|---|---|---|---|
| 210 | 1 | 300 Hz Vibration | 300 seconds |
| 210 | 2 | 0.5 Hz Kneading | 600 seconds |
| 210 | 3 | 1 Hz Kneading | 300 seconds |
| 210 | 4 | 300 Hz Vibration | 300 seconds |
| 211 | 1 | 300 Hz Vibration | 300 seconds |
| 211 | 2 | 0.5 Hz Kneading | 600 seconds |
| 211 | 3 | 1 Hz Kneading | 300 seconds |
| ... | ... | ... | ... |

*FIG. 4*

SYSTEMS AND METHODS FOR PROVIDING CUSTOMIZED AND ADAPTIVE MASSAGING IN VEHICLE SEATS

CROSS-REFERENCE TO RELATED APPLICATIONS

This application claims the benefit of U.S. Provisional Application No. 62/357,154, filed Jun. 30, 2016, the entirety of which is hereby incorporated by reference.

BACKGROUND

Modern day vehicles often include vehicle infotainment systems as standard equipment. Vehicle infotainment systems can include a collection of hardware and software in automobiles that provide audio entertainment, video entertainment, vehicle navigation, and other sources of information. Modern day vehicle infotainment systems can also include various modules such as, but not limited to, automotive navigation systems, video players, USB and Bluetooth connectivity, Carputers, in-car internet, and WiFi. The vehicle infotainment systems can be controlled via touch screen controls, steering wheel controls, hands free voice control, and/or other means. Many vehicle manufacturers market infotainment systems to customers as brand differentiators.

SUMMARY

Various examples are described for systems and methods for providing customized and adaptive massaging in vehicle seats. In one disclosed example, a method for providing customized and adaptive massaging in vehicle seats includes the steps of receiving profile information associated with an occupant of a seat of a vehicle; receiving a current driving mode of the vehicle; selecting a massage setting for the seat based on the profile information and the current driving mode; and massaging the occupant of the seat based on the massage setting.

One disclosed system for providing customized and adaptive massaging in vehicle seats includes a seat disposed within a vehicle, the seat comprising a seating area having compliant cover, the seat further comprising a plurality of actuators arranged to apply forces to the compliant cover; a computing device in the vehicle, the computing device in communication with the plurality of actuators, the computing device including a non-transitory computer-readable medium; a processor in communication with the non-transitory computer-readable medium, the processor configured to execute program code stored in the non-transitory computer-readable medium to: receive profile information associated with an occupant of a seat of a vehicle; receive a current driving mode of the vehicle; select a massage setting for the seat based on the profile information and the current driving mode; and massage the occupant of the seat based on the massage setting.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more particular examples and, together with the description of the example, serve to explain the principles and implementations of the particular examples.

FIG. 4 shows an example massage program;

DETAILED DESCRIPTION

Figure 1:
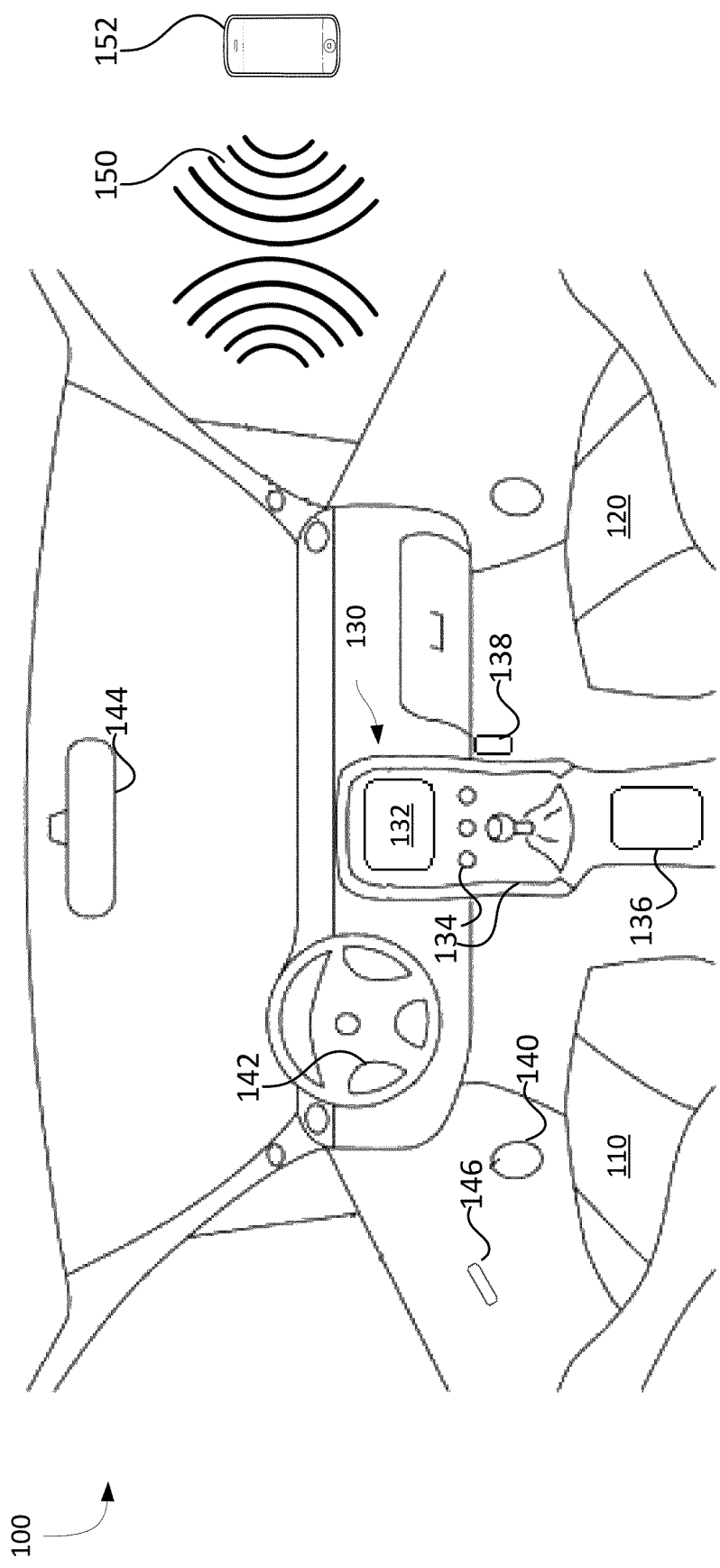
FIG. 1 shows an example vehicle interior.

Examples are described herein in the context of systems and methods for providing customized and adaptive massaging in vehicle seats. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Illustrative Example Systems and Methods for Providing Customized and Adaptive Massaging in Vehicle Seats In this illustrative example, a person climbs into her car and seats herself in the driver's seat, which includes a number of actuators that can be actuated to massage the seat's occupant. The car's infotainment system determines the identity of the driver and accesses profile information for the driver. The profile information includes settings for various systems in the car that may be customized by each occupant and stored for use on subsequent uses of the car. In this example, the profile information includes customized settings for different massages that the driver enjoys. The customized massage settings include which actuators to use during the massage, such as actuators located in the bottom portion of the seat, on which the seat's occupant sits, actuators located in the side bolsters of the seat, in the lumbar region of the seat back, in the shoulder and neck regions, and in the head rest. For example, in response to a determination that an occupant is a pregnant woman, the actuators may provide a massage intended for a pregnant woman (e.g., a massage that spends more time massaging the lower back and hips). The massage settings also include different massage effects and durations for the massage as well as for different portions of the massage. The car's infotainment system may provide the massage by controlling different actuators using different drive signals to cause kneading, vibration, constant pressure, or other types of movements or massage effects to be provided to the occupant of the seat. The massage settings for each of these different actuators may be customized and stored as different massage programs as a part of the profile information for a particular person. In addition, the massage settings may be dynamically modified based on the operating mode of the car.

In this example, the driver's car can operate in multiple different driving modes, including a manual mode, a semi-autonomous mode, and an autonomous mode. The manual mode operates like a traditional vehicle where the driver provides steering, throttle, and braking inputs to maneuver the car. While the vehicle may provide some assistive features in a manual mode, such as anti-lock braking, blind spot warnings, or lane departure warnings, the car does not initiate the inputs resulting in such responses, e.g., the car itself does not make a decision to apply the brakes, but only modulates the brakes to prevent brake lockup. Thus, the driver controls the movement of the vehicle.

In a semi-autonomous mode, the car may provide some inputs that can affect the movement of the vehicle, and the car may provide multiple levels of semi-autonomous control of increasing intrusiveness. For example, a lower-level semi-autonomous mode may include a cruise control or an adaptive cruise control. More intrusive levels of semi-autonomous control may include lane departure corrective steering inputs, emergency braking, or parking assistance. A fully autonomous mode for the car enables the car to operate without any inputs from the driver such that the driver can occupy herself with other activities such as reading, sleeping, or watching content on a display screen, e.g., a movie.

When the driver starts the car, she may select a driving mode for the vehicle, which can be used to determine the massage settings to employ based on the profile information. For example, in a manual mode, the car may restrict the actuators that may be used to provide a massage. In this example, when in a manual driving mode, the car's infotainment system accesses configuration information that indicates that actuators to provide massage output to the driver's legs may not be used. Such massage outputs may interfere with the driver's ability apply the accelerator or brake pedal. In addition, actuators in the head rest may not be used, because such massage motion may interfere with the driver's ability to see clearly as the driver's head is manipulated by the actuators. Later, however, the driver selects a fully-autonomous mode, enters a desired destination, and allows the car to begin navigating to the destination. In response to the driver's selection of the fully-autonomous mode, the car's infotainment system selects a massage setting based on the driver's profile information and the car's operating mode, i.e., an autonomous mode in this case, and begins outputting a full-body massage employing each of the actuators in the driver's seat according to the massage settings in the driver's profile information.

At a yet a later time, the driver changes the car's operating mode to a semi-autonomous mode. In response, the car's infotainment system modifies the massage outputs to eliminate use of the actuators in the head rest, and outputs a customized massage according to the driver's profile information for a semi-autonomous driving mode.

The above illustrative example is given to introduce the reader to the general subject matter discussed herein, and the disclosure is not limited to this example. The following sections describe various additional non-limiting examples and examples of systems and methods for providing customized and adaptive massaging in vehicle seats.

Referring now to FIG. 1, FIG. 1 shows an example vehicle interior 100 that can include certain features. Vehicle interior 100 includes two front seats 110 and 120 and can include additional seats behind the front seats 110 and 120. In this example, each of the front seats 110 and 120 includes multiple actuators that can be actuated to provide massages to occupants of the seats. Other features of vehicle interior 100 are discussed in later sections of this disclosure.

Figure 2:
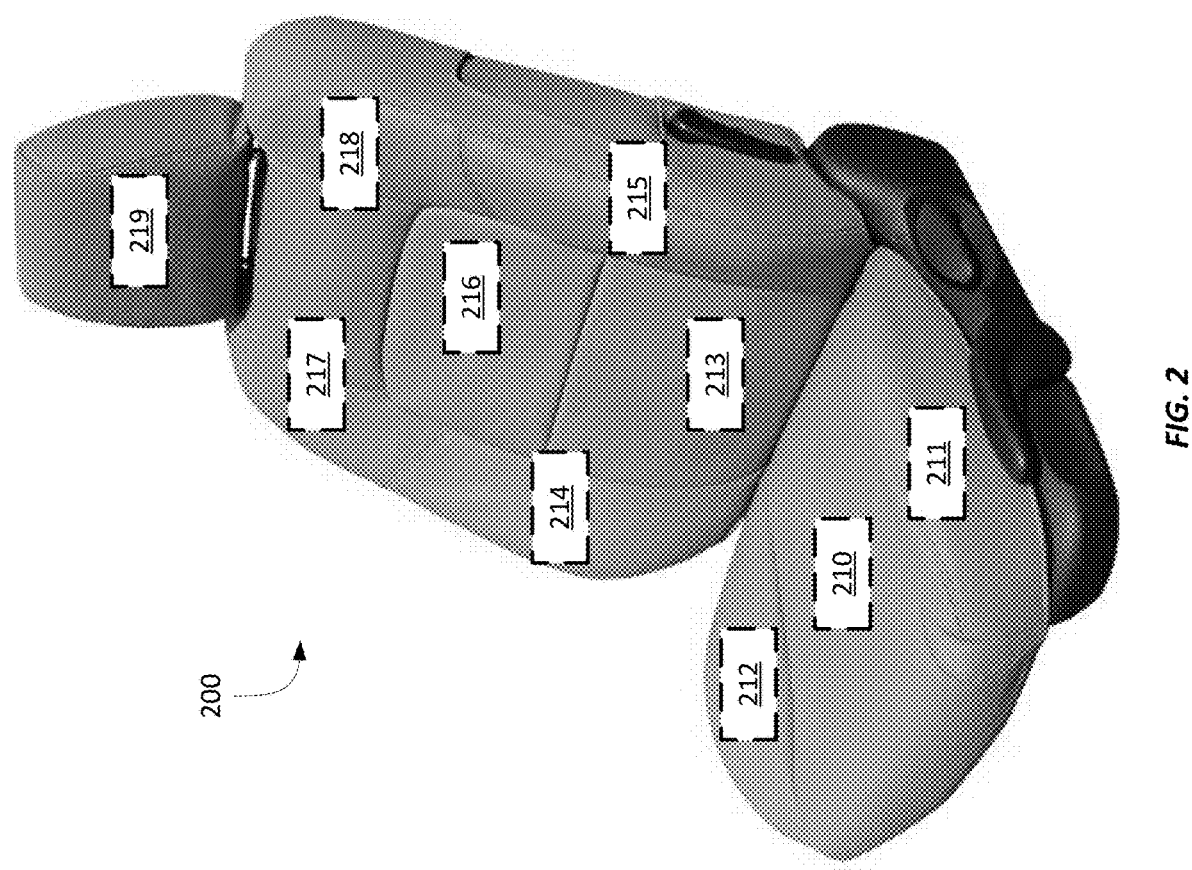
FIG. 2 shows an example vehicle seat equipped with actuators configured to provide massage outputs.

Referring to FIG. 2, FIG. 2 shows an example seat 200 with multiple actuators 210-219 that can be actuated to provide a massage to the seat's occupant. In this example, the seat 200 is a bucket seat for an individual passenger; however, other suitable seats may be used. For example, a suitable seat may be a bench seat, a zero-gravity seat (which may be a seat that can be reclined or rotated to a position where the occupant's feet are raised to be even with or above the occupant's heart) or a seat capable of reclining to a fully flat configuration to allow the occupant to sleep horizontally.

As may be seen in FIG. 2, the seat 200 includes multiple actuators 210-219 that are positioned at various locations within the seat. In this example, each of the actuators 210-219 is positioned beneath the surface of the seat 200, but each is configured to apply forces to an occupant through the seat cover. For example, an actuator can have a rotor with one or more lobes such that when the rotor is rotated, the lobes are rotated to press against the seat cover and thus the seat's occupant. As the lobe rotates away from the seat cover, the pressure is relieved until the next lobe is rotated to press against the seat cover. In some examples, an actuator may be configured to provide a vibration effect or a constant pressure effect. For example, a rotor lobe may be rotated and halted such that the lobe is oriented to press against the seat cover. Or the rotor lobe may be rotated rapidly, e.g., at 20 Hz, to provide a vibration effect. Alternatively or additionally, an actuator may comprise one or more rollers that can apply pressure against the seat cover in a rolling motion to provide massage to the occupant, with or without vibrational effect.

In some examples, multiple different actuators may be incorporated into the seat 200 to provide different massage effects. For example, the lobed rotor discussed above may provide kneading or constant pressure effects, while a different actuator may be provided to output vibration effects. Suitable actuators for outputting vibrations may include eccentric rotating mass (ERM) actuators, linear resonant actuators (LRAs), piezoelectric actuators, etc. It should be appreciated that while the seat 200 shown in FIG. 2 depicts one actuator in each particular location, e.g., in the lumbar area of the seat back, suitable seats according to this disclosure are not so limited. Rather, any suitable number of actuators may be provided to provide a massage output in a particular region. Further, while the actuators above are actuators that may result in movement of a portion of an occupant's body, e.g., by vibration or manipulation by a rotor lobe, other types of actuators may be employed, such as to provide heat or cold to a particular region, e.g., through the use of heating elements or cooled air or liquid. In some examples, a portion of the seat, e.g., the foot portion, may be configured to hold water, such as to provide a foot bath. Thus, when one or more actuators are actuated in a region associated with the foot bath, the occupant may experience a relaxing foot massage.

Figure 3:
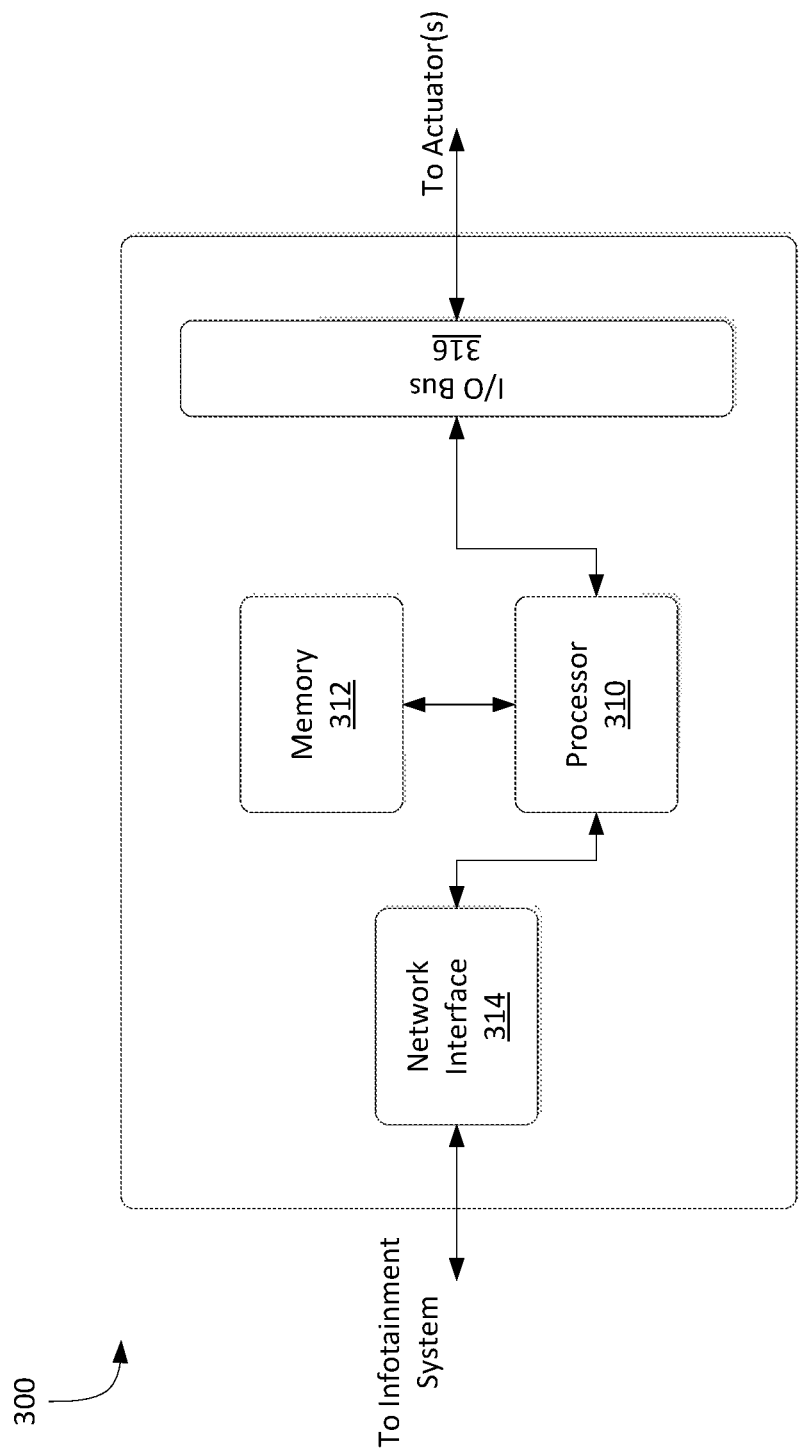
FIG. 3 shows an example massage controller for providing customized and adaptive massaging in vehicle seats.

In some examples, the seat 200 may also include or be in communication with a massage controller. Referring now to FIG. 3, FIG. 3 shows an example massage controller 300. In this example, the massage controller 300 includes a processor 310 and a memory 312. In addition, the massage controller 300 includes a network interface 314 to enable communications with other systems within the vehicle, and an input/output (I/O) bus 316 for communicating control signals from the massage controller 300 to one or more actuators in a seat, such as the actuators 210-219 in the seat 200 depicted in FIG. 2. The network interface 314 can provide electrical connections and any suitable networking protocols, such as Car Area Network (CAN) protocols, Internet Protocols (IP), including Transmission Control Protocol (TCP) or User Datagram Protocol (UDP), or other suitable networking protocol(s).

In some examples, the massage controller 300 can receive a massage program, such as from a vehicle infotainment system via the network interface 314, and execute the massage program to actuate one or more of the actuators 210-219 to provide the programmed massage. In some examples, a massage controller may be dedicated to a single seat or may have control over massage functionality in multiple seats.

A massage program generally refers to information that indicates when and how to actuate different actuators, e.g., actuators 210-219, to provide a massage to a user. For example, FIG. 4 shows an example of a part of a massage profile 400 for the seat 200 shown in FIG. 2. Each entry in the massage profile 400 indicates an actuator, a sequence number, an output for the actuator, and a duration of the output. Thus, the first output for actuator 210 is a 300 Hz vibration for 300 seconds, followed by a 0.5 Hz kneading movement for 600 seconds, followed by a 1 Hz kneading movement for 300 seconds, followed by a 300 Hz vibration for 300 seconds. The outputs for actuator 211 are similarly depicted. In some examples, each actuator will be started simultaneously and will each progress through their respective sequences in parallel.

In some examples, the massage controller 300 may not receive a massage program, but instead may receive commands from another system, such as an infotainment system. The infotainment system may transmit high-level massage commands to the massage controller 300 that indicate the actuator or location for a massage output, the type of output, e.g., kneading, vibration, etc., a duration for the output, and, optionally, one or more characteristics of the output type such as a frequency, magnitude, pulse width modulation ratio, etc. Thus, in such an example, the infotainment system may maintain a massage program that is used to issue commands to the massage controller 300.

It should be noted, however, that while a separate massage controller is described in the example above, such a discrete component is not required. Rather, such functionality may be incorporated into the infotainment system itself or may be incorporated into, or distributed among, other systems within the vehicle.

Referring again to FIG. 1, the vehicle can also include an infotainment system 130 that can comprise various components to provide one or more interfaces between user(s) and various systems within the vehicle. The infotainment system 130 can also store and access user profile information for different people who have ridden in the vehicle and use the user profile information to customize the user experience with respect to various in-vehicle systems. For instance, in this example, the infotainment system is configured to provide signals to the actuators in the front seats 110, 120 to control the actuators, to provide massages to the occupants of the respective seats.

In some examples, the infotainment system 130 can also provide information to one or more vehicle occupants, such as vehicle status, navigation information, temperature information, etc. The infotainment system 130 can also enable the user to interact with entertainment functionality, such as a radio, a satellite radio, content (e.g., movies), massage functionality, etc. The infotainment system 130 can include multiple input and output devices, such as cameras, microphones 144, controls 134, 142, and 146, speaker 140, and access points 136 and 138. The infotainment system can include a wireless transceiver (not illustrated) for communication with mobile device 152.

Vehicle interior 100 includes a display 132 that can be a touch enabled display, for example. Display 132 can be a Liquid Crystal Display (LCD), Organic Light Emitting Diode (OLED), or other display. Display 132 can include various backlighting devices. Capacitive, resistive, and/or other touch sensors can be integrated with or within display 132. Display 132 can also be associated with various proximity sensors that can include, for example, ultrasound sensors, visual sensors, infrared sensors, or other. Display 132 can be polarized or include a polarizing or other cover that can be retractable.

Display 132 can operate in various modes. For example, display 132 can be used for routing of a vehicle via a Global Positioning System (GPS) or other mapping mode. Display 132 can display vehicle or environment information, such as temperature, location, weather, views from various cameras, or other. Display 132 can be used to display information for massage programs or settings, entertainment, such as movies, television shows, or information pertaining to music or other audio that may be provided by the infotainment system.

Door mounted controls 146, steering wheel controls 142, and center console controls 134 can be used to provide commands to the infotainment system (in addition to a touch screen if implemented via display 132). Any of controls 134, 142, and 146 can be a physically actuated button, knob, or similar device. Controls 134, 142, and 146 can be proximity, touch, or other sensors. Functionality can be shared or distributed between controls 134, 142, and 146. For example, center console controls 134 can be dedicated to Heating, Ventilation, and Air Conditioning (HVAC) controls, stereo controls, or other subsystem controls. Central console controls 134 can include various control knobs, surfaces, switches, or other physical or virtual controls, such as controls displayed on a touch-sensitive display device. Door mounted controls 146 can be isolated to controls available to a driver of the vehicle. For example, door mounted controls 146 may be able to lock out or override other users. Door mounted controls 146 may be capable of altering a portion of display 132 or a console mounted display (not illustrated) dedicated for use by a driver. In some examples, door mounted controls may provide a user with control over an orientation of a seat or positioning of one or more actuators located within the seat, e.g., to move the actuator closer to or further away from the seat cover to provide greater or lesser intensity from the selected actuator(s).

Although not illustrated, various media receptacles can be integrated with the infotainment system, such as optical disk drives or other. Access point 136 can be an inductive charging pad, for example, that may allow a user to charge mobile device 152 by placing mobile device 152 on access point 136. Access point 136 may also contain or be co-located with various transceivers to enable communication modes with mobile device 152 when it is placed on access point 136. For example, an NFC transceiver can be collocated with access point 136. Access point 138 can be, for example, a USB access port that may allow an occupant to charge mobile device 152, for example. Access point 138 may also allow a user with a communication medium through a tethered connection to the infotainment system. Such connections may enable a user to interact with massage functionality provided by the infotainment system 130 or other portions of the vehicle.

Microphone 144 is an example microphone for use with hands-free communications. Such communications can be used to remotely converse with other parties or command the infotainment system, for example to select or customize a massage setting or program. Various other microphones can be located throughout the illustrated vehicle to optimize audio reception for various locations, enable noise cancellation, or other. Speaker 140 is an example speaker that can be used to output audio to user(s) in the form of music, commands, and or communications. Speakers can be located throughout the illustrated vehicle to optimize audio reception for various locations, enable noise cancellation, or other.

Although a wireless communication transceiver is not illustrated, mobile device 152 is illustrated as communicating with the infotainment system via wireless transmissions 148 and 150. Wireless transmissions 148 and 150 can represent various communication protocols, signal strengths, or other communication modes that may be used for communication between the infotainment system and mobile device 152. The communications, as illustrated, can be bidirectional between mobile device 152 and the infotainment system. Furthermore, wireless communication can be enabled when mobile device 152 is located within the vehicle, outside, but in proximity with the vehicle, or remote from the vehicle using various communication modes. For example, Bluetooth® communications can be utilized when a device is within an interior of a vehicle, Wi-Fi® can be utilized when the device is outside of the vehicle, but still in proximity with it, and cellular communications can be used if mobile device 152 is remote from the vehicle. Such features can be employed, for example, to identify one or more occupants of the vehicle, or to obtain one or more massage programs stored in an occupant's wireless device.

Figure 5:
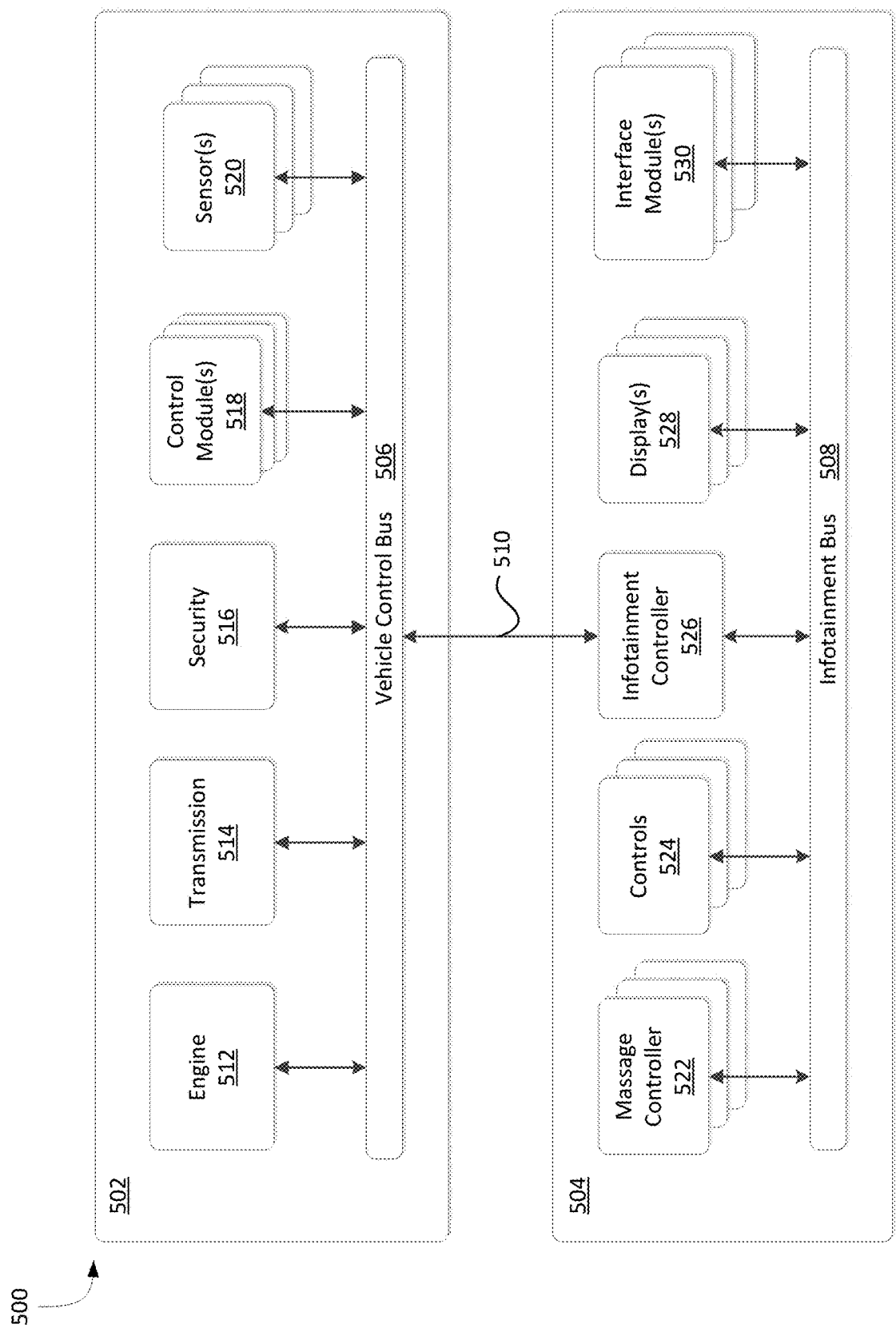
FIG. 5 shows an example system architecture diagram including infotainment system and one or more massage controllers.

Referring now to FIG. 5, FIG. 5 shows an example system architecture diagram 500 including infotainment system 504 and one or more massage controllers 522. Also illustrated is a vehicle control system 502. Vehicle control system 502 can comprise various components for operation of the vehicle systems related to operating the vehicle's drivetrain or braking systems. For example, engine 512 is a component of a drivetrain of a vehicle that can include various sensors such as camshaft position sensors, crankshaft position sensors, mass air flow meters, temperatures sensors, oxygen sensors, pressure sensors, throttle position sensors, or other. Furthermore, engine 512 can comprise various actuators for control of valve timing, air conditioning coolant, or other. A common vehicle control bus 506 is illustrated as coupling the various components of vehicle control system 502. However, the vehicle control bus 506 is illustrated as such for simplicity. It should be understood that various sensors, actuators, and other components can use discrete, Controller Area Network (CAN), or other communication protocols. While in this example, the engine is described in terms of an internal combustion engine (ICE), other types of engines may be employed, such as battery-powered electric motors, fuel cells (e.g., hydrogen fuel cells) powered electric motors, solar-powered electric motors, hybrid ICE/electric motors, etc.

Transmission 514 is an additional component of vehicle control system 502 that transfers power from an ICE or other motor to an output device that propels the vehicle, such as a wheel or axle. While most vehicles employ one or more transmissions, they may not be required in all examples. Transmissions can include various other sensors and/or actuators, such as speed sensors, temperatures sensors, overdrive switches, lock-up torque converter actuators, clutch engagement actuators, or other. Security module 516 can include various sensors for detection of possible theft of a vehicle, such as tilt sensors, vibration sensors, location sensors, shock sensors, or other. Additionally, security module 516 can include a dedicated transceiver for communication with a key fob or other device, or can include cryptographic or identification logic for identification of a key fob or other device.

Control modules 518 may include one or more computing devices or functionality provided by a computing device. For example, a vehicle may have an electronic control unit, commonly referred to as an ECU. The ECU may provide control signals for the engine 512 and transmission 514, such as ignition timing, air/fuel mixture information, automatic transmission shift points, etc. In some examples, the control modules 518 may include an autonomous driving control module that can provide semi-autonomous or autonomous driving functionality. Further, the autonomous driving system may provide varying levels of semi-autonomous modes that engage or disengage functionality based on a driver's condition, e.g., alert, fatigued, distracted, etc., or desired level of autonomous control. The autonomous driving control module may communicate with one or more sensors, such as LIDAR sensors, radar sensors, cameras, range finders, etc., as well as one or more other vehicle systems, such as a navigation system, to provide autonomous or semi-autonomous driving functionality. The vehicle's infotainment system 504 may communicate with the autonomous driving system, such as to obtain vehicle driving mode information or settings, or to request a change in vehicle driving mode.

As illustrated, vehicle control system 502 can be segregated from infotainment system 504. This segregation may isolate systems required to operate a vehicle from systems designed to provide entertainment or information to users. Such segregation may be desirable to prevent a system from causing a failure with operation of the vehicle. Additionally, the two system can operate on different standards or buses. For example, vehicle control bus 506 can be relatively slower, but more reliable than infotainment bus 508. Furthermore, segregating the systems can allow infotainment system 504 to be upgraded/adapted on a different timeline than vehicle control system 502 to enable quicker integration of consumer entertainment electronics. Segregation of the systems can also aid in test and evaluation of the two systems and maintaining configuration control for systems.

Infotainment system 504 is illustrated as including infotainment controller 526. Infotainment controller 526 (or other modules) may interface 510 with vehicle control system 502 to provide limited or controlled access. For example, infotainment controller 526 can access vehicle speed, location, a driving mode of the vehicle (e.g., autonomous, semi-autonomous, manual, etc.), or other information that may be obtained from sensors 520.

Massage controller 522 can include one or more massage controllers within a vehicle, such as the example massage controller 300 shown in FIG. 3. In some examples, each seat includes a massage controller 522, while in other examples, each row of seats has a massage controller, or one massage controller may control massage functionality in every seat equipped with massage actuators. Massage controllers 522 can be implemented apart from controls 524 of infotainment system 504. Alternatively or additionally, massage controllers 522 can be integrated with controls 524 of infotainment system 504.

Displays(s) 528 can be located at various locations throughout a vehicle. For example, display(s) 528 can be located on a center dash (such as display 102), as an instrument cluster, as a Heads-Up-Display (HUD), on a front dash in front of a passenger, external to a vehicle, on a seatback (such as for rear passengers of an automobile, a plane, or a train), or other. Display(s) 528 can be implemented through various technologies disclosed herein and be utilize different technologies across displays.

Interface module(s) 530 can provide interfaces to various modules (not illustrated) such as GPS modules, satellite communication modules, wireless communication modules, entertainment database modules, or other. Interface module (s) 530 can also interface to audio amplifiers, speakers, microphones, sensors, or other devices that may be integrated into infotainment system 504.

Infotainment controller 526 can be a central control unit for infotainment system 504, or control of infotainment system 504 can be distributed. In some examples, infotainment controller 526 is mounted within a dash of a vehicle and can provide various infotainment functions. For example, infotainment controller 526 can contain various interfaces modules for Frequency Modulation (FM) radio, Amplitude Modulation (AM) radio, satellite radio, cellular communication, or other. Infotainment controller 526 can include various processors such as x86 compatible, ARM® compatible, or other. Infotainment controller 526 can implement various Operating Systems, such as Linux®, Windows®, Android®, etc. Infotainment controller 526 can also be coupled to one or more displays, interfaces modules, controls, massage controllers, etc.

In some examples, infotainment controller 526 can be distributed. For example, infotainment controller 526 can contain various processors, displays, interfaces modules, or other devices that can be distributed throughout a vehicle. For example, an automobile may have dedicated infotainment components for each station, wherein each station can be associated with a seat (e.g., screen(s), speaker(s), control (s), massage controller(s), etc.). Infotainment controller 526 functionality can likewise be distributed across these various stations. Functionality of infotainment system 504 can be distributed across these modules or isolated to certain modules, stations, or other. In certain examples, stations can be associated with more than one seat/user. In certain examples, stations can be distributed through a bus, plane, train, boat, or other vehicle.

Figure 6:
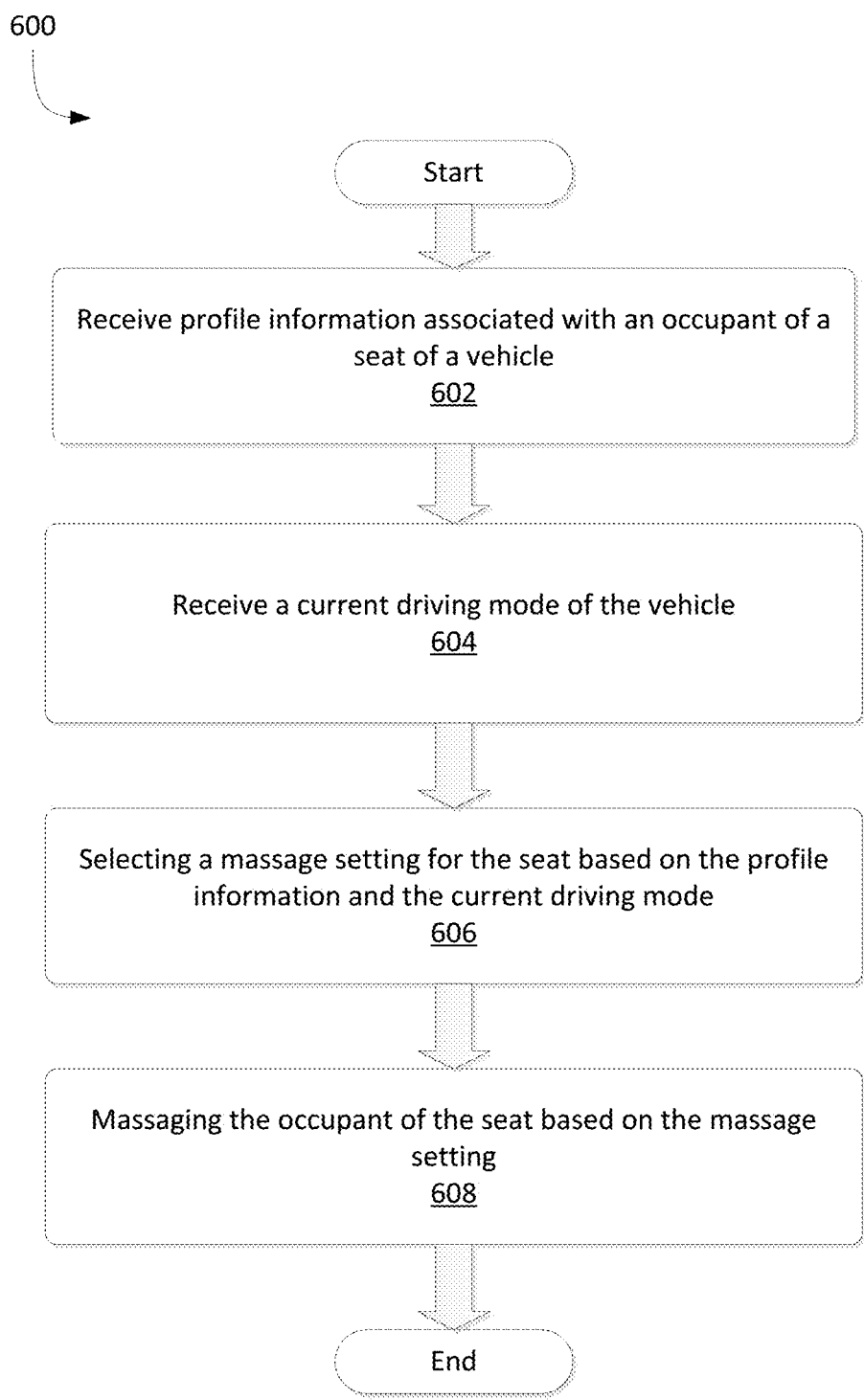
FIG. 6 shows an example method for providing customized and adaptive massaging in vehicle seats.

Referring now to FIG. 6, FIG. 6 shows an example method 600 for providing customized and adaptive massaging in vehicle seats. The method 600 of FIG. 6 will be described with respect to the seat 200 shown in FIG. 2, the massage controller 300 shown in FIG. 3, and the system architecture shown in FIG. 5. However, execution of the method 600 of FIG. 6 is not restricted to such examples. Instead, any suitable seat, massage controller, or system architecture according to this disclosure may be employed in one or more examples.

At block 602, the infotainment controller 526 receives profile information associated with an occupant of a seat of a vehicle. In this example, a person sits in a passenger seat of the vehicle and the infotainment controller 526 causes a display 528 to display a list of names and an option to add a new name. The person finds their name in the list and selects it by touching the display 528 at a location corresponding to the name. If the person does not find their name, they may enter a new name to create a new profile. The new profile is initially populated with factory-programmed default settings. After the person selects her name, the infotainment controller 526 accesses profile information stored in memory and locates the profile information associated with the person's name. For example, the infotainment controller 526 may issue a query to a database, such as a SQL database, for a profile by providing the user name selected by the person. In response, the infotainment controller 526 receives a response from the database with the corresponding profile information. After receiving the profile information, the infotainment controller 526 can adjust settings for one or more infotainment or vehicle systems, such as radio presets and volume settings, climate control settings, cruise control settings, autonomous driving mode settings, massage settings, etc., based on the profile information.

In some examples, rather than requiring a person to manually select their name, the vehicle may automatically recognize one or more occupants. For example, the infotainment controller 526 may access one or more cameras to identify a vehicle occupant based on facial recognition. Or the infotainment system 504 may access other biometric information about the user, such as a fingerprint or voice print. In some examples, an occupant's mobile device, e.g., a smartphone, may connect with or communicate with the infotainment system 504, e.g., via BlueTooth or NFC communications, and provide information about the person's identity. After determining the identity of a vehicle occupant, the infotainment controller 526 may access profile information for the identified occupant.

In some examples, some or all of the profile information may be provided to the massage controller 300. For example, the infotainment controller 526 may receive profile information and extract one or more massage settings. The infotainment controller 526 may then transmit the massage settings to the massage controller 300 using the infotainment bus 508. In some examples, the infotainment controller 526 may send all of the profile information to the massage controller 300. For example, the massage controller 300 may adjust a massage based on certain other settings, such as radio station preferences, volume preferences, climate control preferences, etc.

As discussed above, a vehicle may have multiple seats, thus, if multiple occupants are riding in the same vehicle, the infotainment controller 526 may access profile information for each occupant in the vehicle.

After receiving the profile information, the method 600 proceeds to block 604.

At block 604, the infotainment controller 526 receives the current driving mode of the vehicle. In this example, the infotainment controller 526 transmits a request for a current driving mode to the autonomous driving control module, which transmits, in response to the request, a current driving mode of the vehicle. In this example, the autonomous driving control module can respond with "manual mode," "fully-autonomous mode," or a level of a semi-autonomous mode. For example, as discussed above, different kinds of semi-autonomous modes may be employed, from less intrusive semi-autonomous modes that provide adaptive cruise control, to more intrusive semi-autonomous modes that will maintain a lane, an established speed, and safe spacing from other vehicles without requiring driver inputs; however, to change lanes or speeds, the driver may move the steering wheel or apply throttle or brake inputs. Still other semi-autonomous driving modes may be employed.

When responding to the request from the infotainment controller 526, the autonomous driving control module may provide a level of semi-autonomous driving, such as "semi-autonomous mode 1" or "semi-autonomous mode 4." In some examples, the autonomous driving control module may respond with a list of functionality that is currently under automatic or manual control. For example, the autonomous driving control module may respond with a data structure, e.g., an XML, file, having the following information regarding driving functions and the current mode:

| Function | Control Type |
|---|---|
| Steering | Manual |
| Vehicle Speed | Autonomous |
| Lane Control | Autonomous |
| Braking | Manual |

After receiving the current driving mode, the method 600 proceeds to block 606.

At block 606, the infotainment controller 526 selects a massage setting for the seat based on the profile information and the current driving mode. In this example, the infotainment controller 526 accesses massage settings stored in the profile information. The massage settings may include preferences for massage types, such as "neck and shoulder massage," "full body massage," "deep tissue massage," "pressure point massage," etc. Such preferences may each have corresponding massage program, as discussed above with respect to FIG. 4. For example, a "neck and shoulder massage" may have one or more corresponding massage programs. In some examples, a corresponding massage program may have a basic template for a massage, e.g., types of massage outputs (such as vibration or kneading) for each actuator, while intensity and duration may be adjusted dynamically based on driver condition, e.g., tired, alert, distracted, etc., time of day, music being played by the infotainment system 504, etc.

For example, the vehicle may include a camera that tracks a person's gaze to determine what the user is looking at. For example, a camera may track the driver's face and provide image information to the infotainment controller 526. The infotainment controller 526 may determine from the received camera images whether the driver is watching the road, is distracted, or is nodding off to sleep. Based on such a determination, the infotainment controller 526 may adjust one or more settings in a massage program. For example, if the driver is alert, the infotainment controller 526 may decrease an intensity of one or more actuator outputs to reduce the chance of distracting the driver. However, if the driver is distracted, the infotainment controller 526 may increase the intensity of the massage to regain the driver's attention.

In some examples, if the driver is apparently nodding off to sleep, the infotainment control 526 may change actuator outputs from a "kneading" output to a "vibration" output to try to wake the driver, e.g., when the vehicle is approaching a programmed destination. Or, in some examples, the infotainment controller 526 may transmit a message to the autonomous driving control module to change to an autonomous driving mode to allow the driver to safely fall asleep. The infotainment controller 526 may then update the "current driving mode" to "autonomous" and may also select a new massage setting.

Or, in some examples, if the driver is already sleeping while the vehicle is an autonomous driving mode, the infotainment controller 526 may select a massage program configured to gradually wake up the driver. For example, a massage program may be selected that specifies the use of progressively higher magnitude actuator outputs over time, which may gradually rouse the driver. While these examples have been described in the context of a driver of a vehicle, they are not so limited, but instead could be used for any or all of the occupants of a vehicle.

In some examples, multiple occupants may be seated in a vehicle. In one such example, the infotainment controller 526 may select a massage setting for one vehicle occupant based on a massage setting for another vehicle occupant. For example, a husband and wife may be on a long drive to visit their children at college. After accessing the profile information for each passenger, the infotainment controller 526 may determine that the profile information indicates that the two occupants prefer to have massages that are synchronized to each other's massages, such as to provide a "couple's massage" experience. Thus, the infotainment controller 526 selects a massage setting for the seat based on the profile information and the current driving mode, including a setting indicating synchronized massages for two or more occupants of the vehicle.

In some examples, the infotainment controller 526 may also access information about music being played by the infotainment system 504. For example, the infotainment controller 526 may accesses artist or song title information to determine a genre for the music, or may determine a tempo or volume of the music. The infotainment controller 526 may then adjust, for example, a speed at which a kneading motion is provided or an intensity of a kneading motion, to better synchronize the massage with the music being played. In some examples, the user profile information may associate a massage program with a playlist or an album such that when the playlist is selected or the album is played, the infotainment system 504 may also initiate the associated massage program to synchronize with the playlist or album.

Further, a massage may be output to, for example, a baby seated within a baby seat. For example, a baby seat may include one or more actuators as discussed above, for example, with respect to FIG. 2, or a removable portion of a vehicle seat may be overlaid onto a portion of the baby seat to provide massage functionality to the baby seat. When the baby seat is installed in a vehicle, in this example, the baby seat may be electrically connected to a massage controller within the vehicle, or a massage controller disposed within the baby seat may be connected to an available communications port within the vehicle. Alternatively, as discussed above, no massage controller may be used, and the baby seat's actuators may be connected, e.g., via an available communications port, with the infotainment system.

The baby seat may be associated with a default profile for a baby, or may have a specific profile entered by a parent. The profile may then be used to output a massage to the baby as described herein. Further, the baby seat may incorporate one or more sensors, e.g., a pressure sensor, a microphone, or a camera to detect the baby's current condition. For example the baby seat may determine that the baby is crying based on audio signals received from the microphone. Thus, the baby seat may transmit a signal to the infotainment setting to change or establish a setting associated with the baby's current condition. In another example, the baby seat may detect that the baby is sleeping, e.g., based on pulse rate or breathing rate, and select a massage setting based on the baby's sleeping state. For example, if the baby is sleeping, the vehicle may select a massage setting associated with either less frequent massages or lower intensity massages, or both.

After selecting the massage setting, the method 600 proceeds to block 608.

At block 608, the infotainment controller 526 transmits the massage setting to the massage controller 300. In this example, the infotainment controller 526 transmits a massage program and a seat identifier to the massage controller. The infotainment controller 526 may then immediately command the massage controller to begin outputting the massage, or the infotainment controller 526 may initiate the massage program at a later time, e.g., once the vehicle has left urban surface streets and entered an interstate highway. In some examples, as discussed above, the infotainment controller 526 may not provide the massage program to the massage controller 300, but instead may issue commands to the massage controller 300 to output particular massage effects. These commands may specify an actuator or region, a massage effect type, an intensity level, a frequency, a duration, or any other data describing a massage effect to be output. The massage controller 300, upon initiating the massage, may then output actuator signals to cause one or more of the actuators 210-219 within the seat 200 to begin massaging the occupant of the seat 200 based on the massage setting.

While some examples of methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A method for providing customized and adaptive massaging in vehicle seats of a vehicle comprising:
   receiving, by an infotainment controller of the vehicle, profile information associated with an occupant of a seat of the vehicle;
   receiving, by the infotainment controller, a current driving mode of the vehicle;
   selecting, by the infotainment controller, a massage setting for the seat based on the profile information and the current driving mode; and
   outputting, by a massage controller of the vehicle, actuator signals to one or more actuators positioned within the seat to provide a massage to the occupant of the seat based on the massage setting.

2. The method of claim 1, wherein the current driving mode comprises one of an autonomous driving mode, a semi-autonomous driving mode, or a manual driving mode.

3. The method of claim 1, further comprising, in response to detecting a change in the current driving mode, changing the massage setting based on the change in the current driving mode.

4. The method of claim 3, wherein the change in the massage setting comprises changing an activation state of an actuator associated with a leg region of the seat.

5. The method of claim 4, wherein the change in the massage setting comprising activating an actuator associated with a leg region of the seat based on either (i) detecting a change in the current driving mode to an autonomous mode, wherein the seat is a driver's seat of the vehicle, or (ii) wherein the seat is not a driver's seat of the vehicle.

6. The method of claim 1, wherein the occupant is a driver of the vehicle, and further comprising selecting the massage setting is further based on a detected condition of the driver.

7. The method of claim 1, wherein receiving the profile information comprises:

transmitting a request for user profile information to a remote computing device; and in response to the request, receiving the profile information.

8. The method of claim 1, further comprising detecting an identity of the occupant of the seat.

9. The method of claim 1, further comprising receiving a modification of the massage setting.

10. The method of claim 9, further comprising storing the modified massage setting in the profile information.

11. The method of claim 1, further comprising:

receiving a second massage setting, the second massage setting for a second occupant of a second seat of the vehicle;

selecting the massage setting based on the second massage setting; and outputting second actuator signals to one or more second actuators positioned within the second seat to provide a massage to the second occupant of the second seat based on the second massage setting.

12. The method of claim 11, further comprising synchronizing outputting of at least some of the actuator signals and the second actuator signals.

13. The method of claim 1, wherein the selecting the massage setting is further based on music played by a stereo system of the vehicle.

14. A system for providing customized and adaptive massaging in vehicle seats comprising:

a seat disposed within a vehicle, the seat comprising a seating area having compliant cover, the seat further comprising a plurality of actuators arranged to apply forces to the compliant cover;

a computing device in the vehicle, the computing device in communication with the plurality of actuators, the computing device comprising: a non-transitory computer-readable medium; a processor in communication with the non-transitory computer-readable medium, the processor configured to execute program code stored in the non-transitory computer-readable medium to:

receive profile information associated with an occupant of a seat of a vehicle;

receive a current driving mode of the vehicle;

select a massage setting for the seat based on the profile information and the current driving mode; and output actuator signals to one or more actuators positioned within the seat to provide a massage to the occupant of the seat based on the massage setting.

15. The system of claim 14, further comprising, in response to detecting a change in the current driving mode, changing the massage setting based on the change in the current driving mode.

16. The system of claim 15, wherein the change in the massage setting comprises changing an activation state of an actuator associated with a leg region of the seat.

17. The system of claim 14, further comprising:

a second seat disposed within the vehicle, the second seat comprising a second seating area having a second compliant cover, the second seat further comprising a second plurality of actuators arranged to apply forces to the second compliant cover; and wherein: the computing device is further in communication with the second plurality of actuators and is further configured to execute program code stored in the non-transitory computer-readable medium to:

receive a second massage setting, the second massage setting for the second;

select the massage setting based on the second massage setting; and output second actuator signals to one or more second actuators positioned within the second seat to provide a massage to the second occupant of the second seat based on the second massage setting.

18. The system of claim 17, wherein the computing device is further configured to execute program code stored in the non-transitory computer-readable medium to synchronize outputting of at least some of the actuator signals and the second actuator signals.

19. The system of claim 17, further comprising a stereo system disposed within the vehicle, wherein the computing device is further configured to execute program code stored in the non-transitory computer-readable medium to select the massage setting based on music played by a stereo system of the vehicle.

20. A non-transitory computer readable medium comprising processor-executable program code for providing customized and adaptive massaging in vehicle seats, the program code configured to cause a processor to:

receive profile information associated with an occupant of a seat of a vehicle;

receive a current driving mode of the vehicle;

select a massage setting for the seat based on the profile information and the current driving mode; and output actuator signals to one or more actuators positioned within the seat to provide a massage to the occupant of the seat based on the massage setting.

* * * * *